US009010181B2

(12) United States Patent
Rochoux

(10) Patent No.: US 9,010,181 B2
(45) Date of Patent: *Apr. 21, 2015

(54) METHOD FOR PREDICTING A PHYSICAL INTERACTION EFFECT BETWEEN A TYRE AND A SURFACE COURSE

(75) Inventor: Daniel Rochoux, La Châtre (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 193 days.

This patent is subject to a terminal disclaimer.

(21) Appl. No.: 13/386,709

(22) PCT Filed: Jul. 19, 2010

(86) PCT No.: PCT/FR2010/051514
§ 371 (c)(1),
(2), (4) Date: Mar. 2, 2012

(87) PCT Pub. No.: WO2011/015754
PCT Pub. Date: Feb. 10, 2011

(65) Prior Publication Data
US 2012/0144910 A1    Jun. 14, 2012

(30) Foreign Application Priority Data
Jul. 28, 2009    (FR) ...................... 09 55277

(51) Int. Cl.
*G01M 17/02* (2006.01)
*B60C 99/00* (2006.01)

(52) U.S. Cl.
CPC ............. *G01M 17/02* (2013.01); *B60C 99/006* (2013.01)

(58) Field of Classification Search
USPC ................................ 73/700–756, 146–146.8
See application file for complete search history.

(56) References Cited

U.S. PATENT DOCUMENTS 3,864,967 A    2/1975    Krenzel .......................... 73/146
4,727,501 A    2/1988    Parker et al. .................. 364/574
(Continued)

FOREIGN PATENT DOCUMENTS

JP    9-288002 A    11/1997
JP    2000-241309 A    9/2000
(Continued)

OTHER PUBLICATIONS

G. Heinrich et al., "Rubber friction, treat deformation and tire traction," Wear, vol. 265, pp. 1052-1060 (2008).
(Continued)

*Primary Examiner* — Andre Allen
(74) *Attorney, Agent, or Firm* — Fitzpatrick, Cella, Harper & Scinto

(57) ABSTRACT

In a method for predicting at least one physical interaction effect between a tire and a pavement, a real profile of the pavement is charted, and the real profile is sectioned into several strata each corresponding to an altitude of the real profile. At least one law of variation of at least one pavement descriptor is determined based on the real profile, as a function of the altitude, and an interaction value of each pavement descriptor is determined at an interaction value of the altitude, for each law of variation. A value of a physical interaction effect is predicted based on an interaction value of at least one pavement descriptor.

14 Claims, 2 Drawing Sheets

(56) References Cited

U.S. PATENT DOCUMENTS

| | | | |
|---|---|---|---|
| 5,065,618 A * | 11/1991 | Hodges et al. | 73/146 |
| 5,610,330 A | 3/1997 | Fricke et al. | 73/146 |
| 5,880,362 A * | 3/1999 | Tang et al. | 73/146 |
| 6,077,302 A | 6/2000 | Kumra et al. | 703/7 |
| 6,192,745 B1 * | 2/2001 | Tang et al. | 73/146 |
| 6,264,292 B1 | 7/2001 | Umeno et al. | 303/196 |
| 6,430,993 B1 | 8/2002 | Seta | 73/146 |
| 6,435,014 B1 | 8/2002 | Palmquist et al. | 73/104 |
| 6,529,838 B1 | 3/2003 | Horiuchi et al. | 702/41 |
| 7,451,637 B2 | 11/2008 | Kuwajima et al. | 73/105 |
| 8,180,605 B1 | 5/2012 | Zhu | 703/2 |
| 8,200,463 B2 | 6/2012 | Ueda et al. | 703/8 |
| 8,452,578 B2 | 5/2013 | Shiraishi | 703/7 |
| 2002/0177976 A1 | 11/2002 | Shiraishi | 702/183 |
| 2004/0144168 A1 | 7/2004 | Oku | 73/146 |
| 2004/0243340 A1 | 12/2004 | Miyamoto et al. | 702/142 |
| 2006/0005613 A1 | 1/2006 | Kuwajima et al. | 73/104 |
| 2006/0136151 A1 | 6/2006 | Shiraishi | 702/42 |
| 2010/0305746 A1 | 12/2010 | Shiraishi | 700/199 |
| 2012/0144910 A1 | 6/2012 | Rochoux | 73/146 |
| 2012/0158383 A1 | 6/2012 | Rochoux | 703/2 |
| 2014/0019103 A1 | 1/2014 | Imamura | 703/6 |

FOREIGN PATENT DOCUMENTS

| | | |
|---|---|---|
| JP | 2007-210472 A | 8/2007 |
| JP | 2007-230458 A | 9/2007 |

OTHER PUBLICATIONS

J. Cesbron et al., "Numerical and experimental study of multi-contact on an elastic half-space," International Journal of Mechanical Sciences, vol. 51, pp. 33-40 (2009).

J. Cesbron et al., "Experimental study of tyre/road contact forces in rolling conditions for noise prediction," Journal of Sound and Vibration, vol. 320, pp. 125-144 (2009).

M. Brinkmeier et al., "A finite element approach for the simulation of tire rolling noise," Journal of Sound and Vibration, vol. 309, pp. 20-39 (2008).

Roger James Pinnington, "Hysteretic Friction for an Array of Projections," ITARI (Integrated Tyre and Road Interaction) Project No. FP6-PL-0506437, 44 pages, 2004.

Tatsuo Fujikawa et al., "Definition of road roughness parameters for tire vibration noise control," *Applied Acoustics*, vol. 66, pp. 501-512 (2005).

* cited by examiner

METHOD FOR PREDICTING A PHYSICAL INTERACTION EFFECT BETWEEN A TYRE AND A SURFACE COURSE

FIELD OF THE INVENTION

The present invention relates to a method for predicting a physical interaction effect between a tyre and a roadway pavement. It applies to the prediction of the rolling noise of the tyre on the pavement, without being restricted thereto.

BACKGROUND

A method for modelling the roadway pavement is known from the prior art. In this method, a three-dimensional real profile of the pavement is measured. The real profile comprises real indenters formed by pebbles or gravel chippings incorporated within a matrix, for example tar.

In order to simplify the use of the real profile acquired, real geometric descriptors of the real indenters are determined comprising, for example, a mean height of the indenters, a mean density of the indenters, etc.

Each real indenter is modelled by a virtual indenter, for example a sphere, on the basis of real descriptors. The spheres are described by virtual descriptors, for example a number of spheres per unit area, a radius of each sphere, a position of each sphere, etc. The virtual descriptors thus make it possible to obtain a virtual profile in which the real indenters having a large size are represented by spheres having a large radius while the real indenters having a smaller size are represented by spheres having a smaller radius. The virtual descriptors thus geometrically describe the virtual indenters which, for their part, model the real indenters. The virtual descriptors are thus simplified geometric descriptors of the real indenters.

However, the virtual descriptors thus determined do not take account of the physical reality of the interaction between the pavement and the tyre to describe a given physical effect, for example rolling noise.

It is thus necessary to correct the virtual descriptors with the aid of correction factors, the physical significance of which is ignored most of the time. For example, a PSI (Present Serviceability Index) descriptor is calculated or else a DI (Deterioration Index) descriptor describing, in a complex manner, deterioration of the pavement. Furthermore, these correction factors do not make it possible to predict in a quantitative and precise manner the physical effect under consideration.

SUMMARY OF THE INVENTION

The aim of the invention is to provide a method for predicting which makes it possible to correctly describe the physical interaction between the tyre and the pavement.

For this purpose, the subject of the invention is a method for predicting at least one physical interaction effect between a tyre and a pavement, characterized in that:
a real profile of the pavement is charted,
the real profile is sectioned into several strata, each stratum corresponding to an altitude of the real profile,
at least one law of variation of at least one descriptor of the pavement is determined on the basis of the real profile, as a function of the altitude of the real profile,
a so-called interaction value of each descriptor is determined at a so-called interaction value of the altitude, for each law of variation, and
a value of the physical interaction effect is predicted on the basis of an interaction value of at least one descriptor.

The method according to the invention makes it possible to correctly describe the physical interaction between the tyre and the pavement. By determining the law of variation and finding the interaction value for each descriptor, it is thus possible to correctly describe the physical interaction effect between the tyre and the pavement. Thus, each virtual descriptor is a physical descriptor of the pavement and not a simple geometric descriptor of each real indenter, unlike in the method of the prior art. The interaction value of the altitude corresponds to the profile altitude for which the squashing of the tyre at this altitude faithfully represents the real squashing of the tyre on the pavement.

According to an optional characteristic of the method:
the descriptor or descriptors comprise at least one so-called virtual descriptor of virtual indenters for modelling the real indenters;
the interaction value of each virtual descriptor is determined on the basis, on the one hand, of a law of interaction between the tyre and the pavement and, on the other hand, of each law of variation of the virtual indenters, and
the value of the physical interaction effect is predicted on the basis of the interaction value of at least one virtual descriptor.

The amount of data to be manipulated is less with respect to a digital processing operation of the same physical interaction effect which would lead to an amount of data which is too high and a calculation time which is too long. This is because, for each value of the parameter, the virtual indenters are all the same, even though the real indenters that they model are all different. Also, for each value of the parameter, each real indenter is modelled by a virtual indenter which conveys a physical reality of the interaction between the tyre and the pavement, rather than a geometric reality as in the prior art.

According to optional characteristics of the method:
At least one law of variation of at least one so-called secondary virtual descriptor is determined as a function of at least one of the so-called primary virtual descriptors.
At least one law of variation of at least one so-called real descriptor of the real indenters is determined as a function of the parameter, and a value of each primary virtual descriptor is determined for each value of the parameter on the basis of each law of variation of each real descriptor and of each law of variation of each secondary virtual descriptor.
The real descriptors and the secondary virtual descriptors describe analogous physical quantities of the interaction between the tyre and respectively the real indenters and virtual indenters.
Advantageously, the real descriptors comprise:
a real deformation of the tyre by the real indenters, and
a real volume indented by the real indenters in the tyre, and the secondary virtual descriptors comprise:
a virtual deformation of the tyre by the virtual indenters, and
a virtual volume indented by the virtual indenters in the tyre.
Advantageously, for each value of the variable parameter, the virtual indenters are represented by identical spheres.

The spherical virtual indenters make it possible to faithfully model the field of constraints generated by the real indenters which are generally rounded under the effect of planing caused by traffic. In addition, the virtual descriptors of the spherical virtual indenters are easy to calculate. These descriptors comprise in particular a volume of the sphere or lenticular body, a radius of the sphere, etc.

According to an optional characteristic of the method according to the invention, the rolling noise of the tyre on the pavement is predicted on the basis of a law for predicting the rolling noise as a function of an interaction value of at least one descriptor.

Since each interaction value of each real descriptor correctly models the interaction between the tyre and the pavement, the rolling noise of the tyre on the pavement can thus be determined precisely and in a quantitative manner on the basis of the law for predicting noise.

Such a prediction law is particularly advantageous for the design of the pavement. Indeed, instead of measuring the rolling noise experimentally, for example by means of sound sensors, on a roadway paved with the pavement, it is possible to predict the noise on the basis of a sample of the roadway of just one or a few meters. This affords a saving in the costs of construction of the roadway and of the experiment.

The rolling noise of a given tyre, rolling under given conditions, depends especially on the roughness of the pavement. This roughness causes vibrations of the tyre which generate noise. The pavement also exhibits absorption and reflection characteristics. The rolling noise varies as a function of these characteristics. The method according to the invention, having regard to its physical approach to the physical interaction effect, makes it possible to separate the contribution of each of these characteristics and, for the road designer, makes it possible to determine the characteristic or characteristics which result in a pavement being more or less noisy. Conversely, a noise measurement is global and does not make it possible to distinguish the physical mechanisms from which the noise originates. The measurement alone does not give the clear relationship between the characteristics and the rolling noise and does not allow mastery of the design of the pavement.

Advantageously, the descriptor is the real number of real indenters per unit area of the pavement and the interaction value is the maximum value of the number of real indenters per unit area of the pavement.

It has surprisingly been found that it was possible to correctly predict the rolling noise of the tyre by virtue of the maximum value of the number of real indenters per unit area. In addition, the number of indenters per unit area of pavement is calculated easily in contradistinction to the prior art noise prediction methods in which several tens of descriptors must necessarily be calculated.

Advantageously, the descriptor is the virtual radius of the spheres and the interaction value is the interaction value of the radius of the spheres.

It has been found that the accuracy of the law for predicting noise could be improved by adding the interaction value of the virtual radius of the spheres which is a relevant value for precisely predicting the rolling noise.

The subject of the invention is also a computer program comprising code instructions able to control the execution of the steps of the method such as defined hereinabove when it is executed on a computer.

The subject of the invention is also a medium for recording data comprising, in recorded form, a program such as defined hereinabove.

The subject of the invention is also a making available of a program such as defined hereinabove on a telecommunication network with a view to its downloading.

The subject of the invention is finally a method for manufacturing a pavement comprising a prediction step according to a method such as defined hereinabove.

BRIEF DESCRIPTION OF THE DRAWINGS

The invention will be better understood on reading the description which follows, given solely by way of nonlimiting example and while referring to the drawings in which.

DETAIL DESCRIPTION OF EMBODIMENTS OF THE INVENTION

In the figures, mutually orthogonal axes X, Y, Z corresponding to the customary longitudinal (X), transverse (Y) and vertical (Z) orientations of a roadway have been represented.

Figure 1:
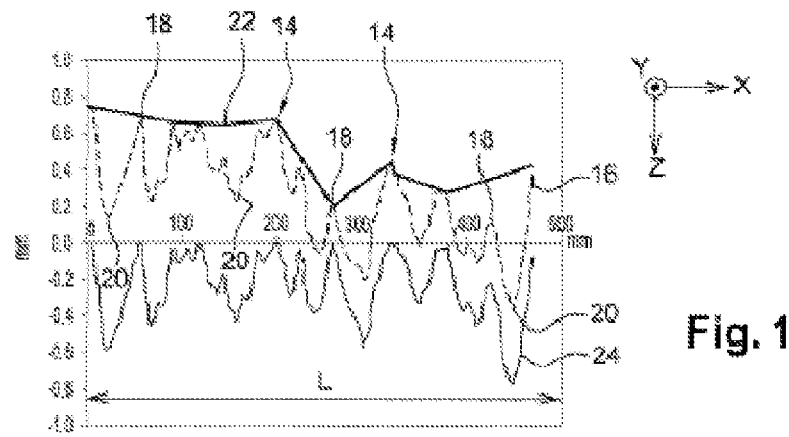
FIG. 1 represents a real profile of a roadway pavement and a filtered real profile of the pavement.
Figure 2:
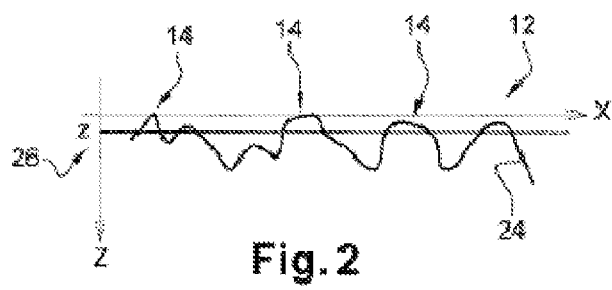
FIG. 2 illustrates a step of sectioning the real profile into strata.

A roadway pavement 12 intended to be in interaction with a tyre has been represented in FIGS. 1 and 2. The pavement 12 comprises a matrix comprising tar, bitumen and/or cement, within which gravel chippings of varying sizes are incorporated. These gravel chippings, also called grit, form indenters 14 on the surface of the pavement 12. The indenters 14 are intended to be in contact with the tyre.

The pavement 12 is manufactured according to a prediction method described hereinbelow.

A two-dimensional so-called real profile 16 of a sample of the pavement 12 is charted, preferably by means of a laser profilometer. In this instance, a depth of the real profile 16 is measured over a length L of the pavement. By acquiring a two-dimensional profile 16, the acquisition time and the hardware to be implemented is decreased with respect to the charting of a three-dimensional profile. The real profile 16 is represented in FIG. 1 in a plane X, Z by a dashed line and exhibits crests 18 and troughs 20. It is considered that each real profile 16 represents a slice of thickness dy of the pavement.

As a variant, several two-dimensional profiles 16 are charted so as to constitute a three-dimensional sample.

The profile 16 is filtered by means of a cutoff filter 22 represented by a broken line in FIG. 1 and called a crest line. The crest line 22 selects and connects the crests 18 exhibiting an altitude z such that a tyre rolling over the profile 16 enters into contact solely with the selected crests 22. Finally, the profile 16 is rectified by reinitializing the altitudes of the selected crests 22 to the zero altitude. A rectified profile 24 is then obtained, represented by a continuous line in FIG. 1.

The profile 24 has been represented in FIG. 2. The profile 24 is discretized as a function of a variable parameter of the profile 24. In this instance, the variable parameter is an altitude z of the profile 24. The profile 24 is then sectioned into several strata 26 along the Z axis, for example a hundred strata, each corresponding to an altitude z. The strata are substantially plane and parallel to the X, Y plane.

So-called real descriptors $N_R$, $y_R$ and $V_R$ of the indenters 14 are defined. The index R indicates that these descriptors are measured on the basis of the real profile 24. A sectional plane of altitude z is also defined, corresponding to a horizontal plane perpendicular to the Z axis and extending at the altitude z. For each real descriptor $N_R$, $y_R$ and $V_R$, a law of variation as a function of the variable parameter z will now be calculated.

Figure 3:
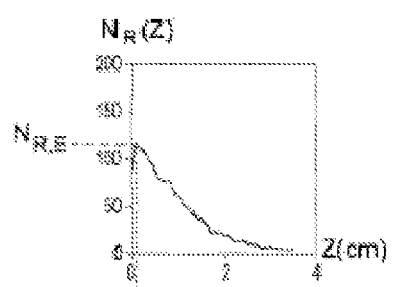
FIG. 3 represents a law of variation of the number of real indenters of the real profile as a function of an altitude z.

With reference to FIGS. 2 and 3, $N_R$ represents the number of real indenters 14 per unit area. For each altitude z, the number of indenters 14 of the profile 24 that are intercepted by each sectional plane of altitude z and per unit area is calculated. A law of variation $N_R(z)$ is then determined as a function of the variable parameter z. Next, a so-called interaction value $N_{R,E}$ is determined on the basis of the law of variation $N_R(z)$. The interaction value $N_{R,E}$ is the maximum value of the number of real indenters 14 per unit area of the pavement 12. In FIG. 3, $N_{R,E}$=115 indenters per m$^2$ for $z_{R,E}$=17 mm.

In the case of a three-dimensional profile, the number of real indenters 14 in contact with the tyre is determined for each altitude z. For one and the same slice dy of pavement, the number of real indenters 14 in contact with the tyre varies if the crests 18 are not coplanar in the slice dy considered.

In the case of a two-dimensional profile, the assumption is made according to which the maximum value of the number of real indenters 14 is the real value of the number of real indenters 14 for each altitude z. Indeed, a local maximum is generally indicative of the presence of a crest 18 along the transverse direction in the slice dy explored.

Figure 4:
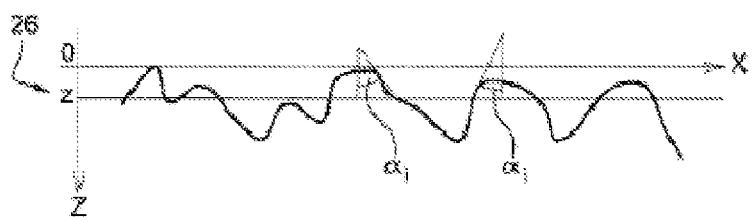
FIG. 4 illustrates a step of determining the real deformation of the tyre by the real indenters.

With reference to FIG. 4, $y_R$ represents a real local deformation of the tyre by each indenter 14. For each altitude z, each deformation $y_{z,i}$ is calculated, defined by $y_{z,i}$=co tan($\alpha_i$) where $\alpha_i$ is the half-angle at the apex of each indenter 14i present at the altitude z. Next, for each altitude z, a mean value of the deformations $y_{z,i}$ is calculated. A law of variation $y_R(z)$ is thus determined as a function of the variable parameter z.

Figure 5:
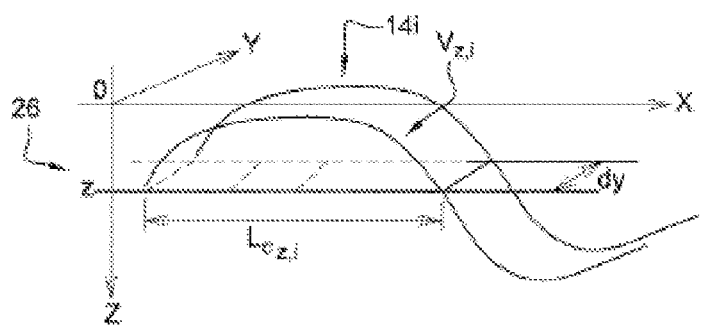
FIG. 5 illustrates a step of determining the real volume indented by the real indenters in the tyre.

With reference to FIG. 5, $V_R$ represents a real volume per unit area indented by the real indenters 14 in the tyre. For each altitude z, each volume, $\Delta V_{z,i}$, indented by each indenter 14i at the altitude z is calculated, defined by $\Delta V_{z,i} = L_{C_{z,i}} \cdot h_{m,i} \cdot dy$ where $Lc_{z,i}$ is a chord length of each indenter i at the altitude z, $h_{m,i}$ is a mean height of each indenter 14i over the length $Lc_{z,i}$. Next, $V_R(z)$ is calculated for each altitude z by adding up the volumes $\Delta V_{z,i}(z)$. A law of variation $V_R(z)$ is thus determined as a function of the variable parameter z and defined by:

$$V_{R(Z)} = \frac{1}{L \cdot dy} \cdot \Sigma \Delta V_{z,i}$$

where L represents the length of the profile 24.

Figure 6:
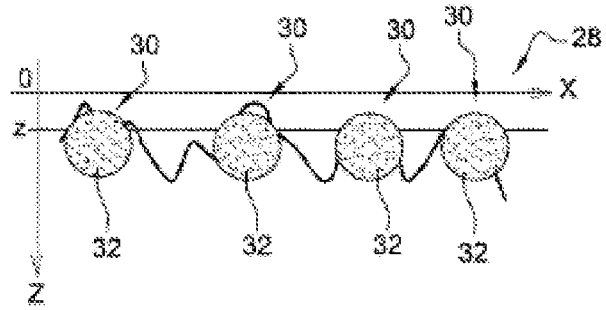
FIG. 6 illustrates a virtual profile obtained by the method according to the invention.

The pavement 12 is modelled by a virtual profile 28 represented in FIG. 6. The virtual profile 28 comprises virtual indenters 30 for modelling the real indenters 14. So-called virtual descriptors of the virtual indenters 30 are defined. Each virtual descriptor varies as a function of the variable parameter z according to a law of variation.

These virtual descriptors comprise primary virtual descriptors $a_V$, $R_V$, $h_V$ and secondary virtual descriptors $y_V$, $V_V$. The index V indicates that the descriptors are virtual. The secondary virtual descriptors $y_V$, $V_V$ and the real descriptors $y_R$, $V_R$ describe analogous physical quantities of the interaction between the tyre and respectively the virtual indenters 30 and real indenters 14. A sectional plane of altitude z corresponding to a horizontal plane perpendicular to the Z axis and extending at the altitude z is defined for the virtual profile 28, in a manner analogous to the real profile 24.

The virtual indenters 30 are represented by spheres 32. As a variant, the virtual indenters 30 may be represented by cones, cylindrical bars or other shapes suited to the type of pavement to be modelled and to the physical interaction effect.

Figure 7:
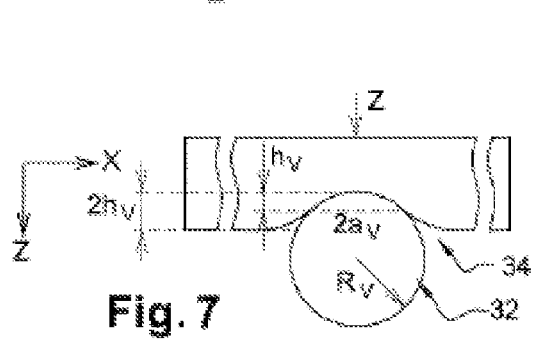
FIG. 7 represents a modelled interaction between the tyre and the pavement.

An interaction between the tyre and a virtual sphere 32 of radius $R_v$ has been represented in FIG. 7. For a load Z applied to the tyre, the sphere 32 creates an indentation of depth 2$h_v$, and comprises a lenticular part 34 in contact with the tyre of maximum radius $a_v$ and of height $h_v$. The interaction between the tyre and the sphere 32 obeys a Hertz interaction law:

$$a_v = \frac{3(1-v^2) \cdot Z \cdot R_v}{4 \cdot E}$$

in which v and E are respectively the Poisson's ratio and the stiffness modulus of the rubber of the tyre.

Figure 8:
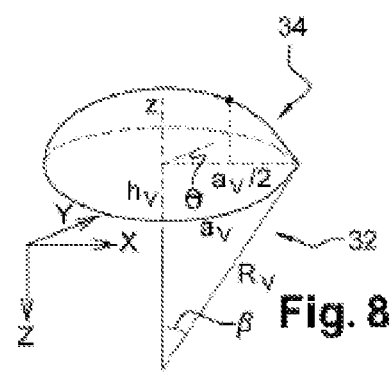
FIG. 8 illustrates a lenticular part of a sphere to which reference is made for the determination of the virtual deformation of the tyre and of the virtual volume indented by the virtual indenters in the tyre.

The lenticular part 34 of a sphere 32 of radius $R_v$ has been represented in FIG. 8. For each secondary virtual descriptor $y_v$, $V_v$, each law of variation will now be calculated as a function of at least one of the primary virtual descriptors $a_v$, $R_v$, $h_v$, here as a function of $a_v$ and $R_v$.

$y_v$ represents a virtual deformation of the tyre by each virtual indenter 30, here by the hemispherical part 34. The real deformation is calculated on the basis of the profile 16 of the real indenters 14 in two dimensions. The virtual deformation is calculated on the basis of the spheres 32 in three dimensions. It is therefore considered that the virtual deformation corresponds to an average of the deformations caused by each sphere 32 according to the set of X, Z planes passing through each sphere 32 as if the spheres 32 were disposed randomly along the virtual profile 28. Thus, on the basis of a real two-dimensional profile, the method makes it possible to determine tridimensional descriptors of the virtual profile.

The mean deformation corresponds, in each sectional plane X, Z, to the deformation imposed by the mid-contact point, that is to say the point with coordinates x=($a_v \cdot \cos \theta$)/2, y=($a_v \cdot \sin \theta$)/2. A slope at the mid-contact point is given by the relation:

$$\frac{dz}{dx} = -\frac{a_v}{2} \cdot \cos\theta \cdot [R_v^2 - \frac{a_v^2}{4} \cdot (1 - 3 \cdot \sin^2\theta)]^{-\frac{1}{2}}$$

In order to obtain the virtual deformation of the tyre $y_V$ over the set of sectional planes X,Z, we calculate:

$$\gamma_{m,v} = \frac{2}{\pi} \int_0^{\pi/2} -\frac{a_v}{2} \cdot \cos\theta \cdot [R_v^2 - \frac{a_v^2}{4} \cdot (1 - 3 \cdot \sin^2\theta)]^{-\frac{1}{2}} d\theta$$

A law of variation $y_v(z)$ is thus determined as a function of $a_v(z)$ and $R_v(z)$ and therefore as a function of z:

$$\gamma_{m,v}(z) = \frac{a_v}{\pi \left(R_v^2 - \frac{a_v^2}{4}\right)^{\frac{1}{2}}} + \frac{1}{8\pi}\left[\frac{a_v}{\left(R_v^2 - \frac{a_v^2}{4}\right)^{\frac{1}{2}}}\right]^3$$

$V_v$ represents a virtual volume indented by the virtual indenters 30 in the tyre, here by the hemispherical part 34.

A law of variation $V_v(z)$ is thus determined as a function of $a_v(z)$ and $R_v(z)$, and therefore as a function of z, in the following manner:

$$V_V(z) = \pi \cdot R_v^3 \cdot \left(\frac{2}{3} + \frac{\cos^3\beta}{3} - \cos\beta\right) \text{ with } \cos\beta = \frac{R_v - h_v}{a_v}$$

Next, a value of each primary virtual descriptor $a_v(z)$, $R_v(z)$ is determined, for each value of the variable parameter z, on the basis of each law of variation of each real descriptor $y_R(z)$, $V_R(z)$ and of each law of variation of each secondary virtual descriptor $y_v(z)$, $V_v(z)$. In this instance, for each value of the variable parameter z, equality is established between, on the one hand, the real indented volume $V_R(z)$ and the virtual indented volume $V_v(z)$ and, on the other hand, the real deformation $y_R(z)$ and the virtual deformation $y_v(z)$. A law of variation of each primary virtual descriptor $a_v(z)$, $R_v(z)$ is thus determined as a function of the variable parameter z. One then speaks of a model with imposed deformation and imposed volume.

It will be noted that the virtual spheres 32 are, for each value of the variable parameter z, identical and all described by the same primary descriptors $a_v(z)$, $R_v(z)$.

Figure 9:
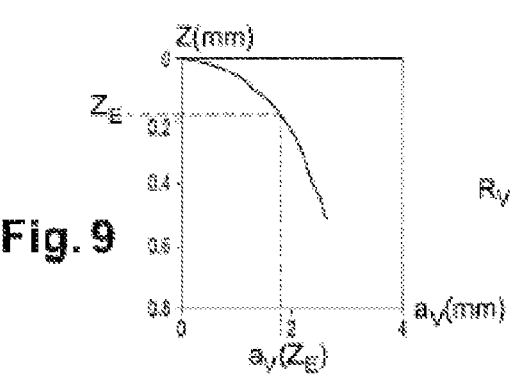
FIGS. 9 and 10 represent laws of variation of virtual descriptors as a function of the altitude z.
Figure 10:
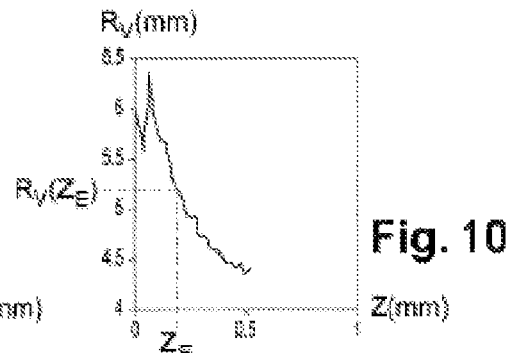

The laws of variation of the primary virtual descriptors respectively $a_v(z)$ and $R_v(z)$ with imposed deformation and imposed volume have been represented in FIGS. 9A and 9B.

A so-called interaction value of the variable parameter, here an interaction value $z_E$ of the altitude z, is then determined on the basis, on the one hand, of the Hertz law of interaction, specified hereinabove, between the tyre and the pavement and, on the other hand, of each law of variation of the primary virtual descriptors $a_v(z)$, $R_v(z)$. The system formed by these three laws is solved numerically and, in the example represented, we obtain $z_E$=0.19 mm. An interaction value of each descriptor $a_v(z)$, $R_v(z)$ at the interaction value $z_E$ is also determined for each law of variation. We obtain $a_v(z_E)$=1.85 mm and $R_v(z_E)$=5.14 mm.

Next, a physical interaction effect between the tyre and the pavement is predicted. In this instance, the rolling noise B of the tyre on the pavement 12 is predicted on the basis of a law for predicting the noise B of the type $B=g(V_1, \ldots, V_n)$ in which $V_1, \ldots, V_n$ are values of descriptors $D_1, \ldots, D_n$ of the pavement.

In the first embodiment, n=2, $D_1$ is a characteristic number of indenters of the pavement 12 and $D_2$ is a characteristic dimension of indenters of the pavement 12. In the example illustrated, the characteristic number of indenters is the interaction value $N_{R,E}$ of the number of real indenters 12 per unit area of the pavement 12 and the characteristic dimension of indenters is the interaction value $R_v(z_E)$ of the radius of the virtual spheres 32.

In this embodiment, the noise B is predicted on the basis of a rolling noise B prediction law defined by:

$$B = 20\log\left[\left(\frac{R_v(z_E)}{Ro}\right)^{\frac{1}{5}}\left(\frac{No}{N_{R,E}}\right)^{\frac{3}{5}}\left(\frac{C}{Co}\right)^k\left(\frac{0.75}{1-v^2}\frac{E}{Eo}\right)^{\frac{1}{5}}\right] + Bo \quad \text{(equation 1)}$$

in which C is the rolling speed of the tyre, v is the Poisson's ratio of the rubber and E the stiffness modulus of the rubber, Bo is a reference rolling noise for a reference tyre with stiffness modulus Eo rolling at the reference speed Co over a reference pavement with reference virtual descriptors Ro and No. k belongs to the interval [1.2-2]. Preferably, k=1.6. As a variant, k=1.2. In another variant, k=2. Bo depends on the location at which the measurement is carried out: inside the vehicle bearing the tyre, at the edge of a track paved with the pavement, etc.

In a second embodiment, n, $D_1$ and $D_2$ are identical to the first embodiment. The noise B is predicted on the basis of a rolling noise B prediction law defined by:

$$B = 20\log\left[\left(\frac{R_v(z_E)}{Ro}\right)^{\frac{1}{5}}\left(\frac{No}{N_{R,E}}\right)^{\frac{3}{5}}\left(\frac{C}{Co}\right)^k\right] + Bo. \quad \text{(equation 2)}$$

When a reference tyre is used to compare several different pavements, the stiffness modulus E and Poisson's ratio v of the rubber are known and are included in the reference constant Bo'. k belongs to the interval [1.2-2]. Preferably, k=1.6. As a variant, k=1.2. In another variant, k=2.

In a third embodiment, having regard to the negligible influence of the descriptor $R_v$ with respect to the other descriptors for certain types of pavements, the rolling noise B of a given tyre is predicted on the basis of a rolling noise B prediction law defined by:

$$B = 20\log\left[\left(\frac{No}{N_{R,E}}\right)^{\frac{3}{5}}\left(\frac{C}{Co}\right)^k\right] + Bo'' \quad \text{(equation 3)}$$

In this embodiment n=1 and $D_1$, the characteristic number of indenters of the pavement, is the only descriptor used. k belongs to the interval [1.2-2]. Preferably, k=1.6. As a variant, k=1.2. In another variant, k=2. Small discrepancies are generally observed between the noise B as predicted by equations 2 and 3.

In a fourth embodiment, the rolling noise B of an arbitrary tyre is predicted on the basis of a rolling noise B prediction law defined by:

$$B = 20\log\left[\left(\frac{No}{N_{R,E}}\right)^{\frac{3}{5}}\left(\frac{C}{Co}\right)^k\left(\frac{0.75}{1-v^2}\frac{E}{Eo}\right)^{\frac{1}{5}}\right] + Bo''' \quad \text{(equation 4)}$$

In this embodiment n=1 and $D_1$, the characteristic number of indenters of the pavement, is the only descriptor used. k belongs to the interval [1.2-2]. Preferably, k=1.6. As a variant, k=1.2. In another variant, k=2.

In a fifth embodiment, the rolling noise B of a given tyre is predicted on the basis of a rolling noise B prediction law defined by:

$$B = 20\log\left[\left(\frac{R_v(z_E)}{Ro}\right)^{\frac{1}{5}}\left(\frac{No}{N_{R,E}}\right)^{\frac{3}{5}}\right] + Bo'''' \quad \text{(equation 5)}$$

This relation makes it possible to obtain a good prediction, taking account solely of the characteristics of the pavement. Indeed, the law takes account of $R_v(z_E)$ which, although exhibiting a lower mathematical weight than $N_{R,E}$, makes it possible to indirectly describe characteristics of the method for manufacturing the pavement such as the nature of the rock, the influence of the mode of crushing. This relation also makes it possible to understand how a modification of the characteristics of the method for manufacturing the pavement modifies the rolling noise.

Example of Predicting the Rolling Noise B for a Given Sculpted Tyre.

Trials have been performed with a sculpted tyre on various pavements T1-T4. The descriptors $N_{R,E}$ and $R_v(z_E)$ for each of these pavements have been determined according to the method according to the invention. The real profile of a sample of 1 m of each pavement T1-T4 is acquired by means of a laser profilometer whose spatial resolutions are dx=0.1 mm along the X axis and dz=0.01 mm along the Z axis. The prediction law of the second embodiment (equation 2) is used, with a value Bo'=45 dB. This value of Bo' corresponds to an experimental average generally measured, outside the vehicle, for a passenger vehicle tyre.

A given vehicle is driven at 60 km/h over each pavement T1-T4. The noise is then measured at three different locations: in proximity to the tyre, inside the vehicle and outside the vehicle as the latter passes by (also called coast-by noise). The results are given in table 1 hereinbelow.

TABLE 1

| Pavement | $N_{R,E}$ (indenters/m$^2$) | $R_v(z_E)$ (mm) | B predicted by equation 2 (dB) | B measured in proximity to the tyre (dB) | B measured outside the vehicle (dB) | B measured inside the vehicle (dB) |
|---|---|---|---|---|---|---|
| T1 | 4131 | 3.6 | 71.8 | 103.5 | 69.2 | 66.6 |
| T2 | 6911 | 4.8 | 69.6 | 103.5 | 66.6 | 63.7 |
| T3 | 19509 | 7.51 | 65.0 | 102 | 61.8 | 59.3 |
| T4 | 28233 | 3.74 | 61.9 | 95.7 | 55.4 | 56.3 |

For the noise measured in proximity to the tyre, the following correlation $B_{measured}=0.73 \times B_{predicted}+52$ is obtained, with a correlation coefficient $R^2=0.8$.

For the noise measured outside the vehicle, the following correlation $B_{measured}=1.26 \times B_{predicted}-21.40$ is obtained, with a correlation coefficient $R^2=0.96$.

For the noise measured inside the vehicle, the following correlation $B_{measured}=1.23 \times B_{predicted}-22.10$ is obtained, with a correlation coefficient $R^2=0.97$.

It is noted that the experimental value $B_{measured}$ may be approximated more accurately by correcting the value of Bo' as a function of the measurement location.

Whatever the measurement location, the correlation between the prediction model and the measurements performed is very satisfactory and makes it possible to compare and predict, on the basis of sample of one or more pavements, the noise B arising from the rolling of a given tyre.

Example of Predicting the Rolling Noise B for a Given Smooth Tyre.

In order to characterize the roughness of the road without interaction with the sculpture of the tyre, a smooth tyre is used. Trials are performed on various pavements R1-R6 illustrating the diversity of the pavements of the road network. The descriptors $N_{R,E}$ and $R_v(z_E)$ for each of these pavements have been determined according to the method according to the invention. The real profile of a sample of 1.7 m of a given pavement is acquired by means of a laser profilometer whose spatial resolutions are dx=0.4 mm along the X axis and dz=0.01 mm along the Z axis. The prediction laws of the second and third embodiments (equations 2 and 3) are used, with a value Bo'=Bo"=45 dB.

A given vehicle is driven at 60 km/h on each pavement R1-R6. Several experimental measurements of the noise in proximity to the tyre are carried out and the experimental measurements for each pavement R1-R6 are averaged. The results are given in table 2 hereinbelow.

TABLE 2

| Pavements | $N_{R,E}$ (indenters/ m$^2$) | $R_v(z_E)$ (mm) | B measured (dB) | B predicted according to equation 2 (dB) | B predicted according to equation 3 (dB) |
|---|---|---|---|---|---|
| R1 | 27128 | 6.1 | 84.9 | 82.9 | 83.8 |
| R2 | 18021 | 4.74 | 85.4 | 84.6 | 85.9 |
| R3 | 15028 | 4.66 | 86.9 | 85.6 | 86.9 |
| R4 | 19884 | 8.66 | 86.0 | 85.2 | 85.4 |
| R5 | 13922 | 5.77 | 87.1 | 86.3 | 87.3 |
| R6 | 5751 | 3.40 | 92.1 | 90.0 | 91.9 |

On the one hand, it is noted that the prediction of the rolling noise B for the set of pavements R1-R6 is excellent, thereby confirming the relevance of the chosen descriptors but also the aptness of the rolling noise B prediction law for very different pavements.

Moreover, it is noted that the value of the noise B predicted by means of the law according to the third embodiment is greater than the value of the noise B predicted by means of the law according to the second embodiment. Within the framework of this example, the law according to the third embodiment makes it possible to obtain predicted values for noise B that are closer to the experimental values than does the law according to the second embodiment.

Finally, it is noted that the accuracy of the predicted noise B is greater than that in the previous example.

All or part of the method according to the invention may be implemented by way of code instructions able to control the execution of the steps of the method when it is executed on a computer. The instructions may emanate from computer programs recorded on a medium for recording data for example of the hard disc or flash memory, CD or DVD type. Provision may be made to make such a program available with a view to its downloading on a telecommunication network such as the Internet network or a wireless network. It will thus be possible for updates of the program to be sent via this network to the computers connected to the network.

The invention claimed is:

1. A method for predicting at least one physical interaction effect between a tyre and a roadway pavement, the method comprising:
   using a computer to chart data obtained from a measurement of a surface of the pavement, to produce a real profile of the pavement;
   using a computer to section the real profile into several strata, each stratum corresponding to an altitude of the real profile;
   determining at least one law of variation of at least one pavement descriptor based on the real profile, as a function of the altitude;
   determining an interaction value of each pavement descriptor, for each law of variation; and
   predicting a value (B) of a physical interaction effect based on an interaction value of at least one pavement descriptor.

2. The method according to claim 1, wherein
   the at least one pavement descriptor includes at least one virtual pavement descriptor of virtual indenters for modelling real indenters of the pavement,
   an interaction value of each virtual pavement descriptor is determined based on
      a law of interaction between the tyre and the pavement, and
      a law of variation of each of the virtual indenters of the pavement, and
   the value (B) of the physical interaction effect is predicted based on an interaction value of at least one virtual pavement descriptor.

3. The method according to claim 2,
wherein the at least one virtual pavement descriptor is at least one primary virtual pavement descriptor, and
wherein the method further comprises:
determining at least one law of variation of at least one secondary virtual pavement descriptor as a function of one or more of the at least one of primary virtual pavement descriptor.

4. The method according to claim 3, further comprising:
determining at least one law of variation of at least one real pavement descriptor of the real indenters as a function of the altitude, and
determining a value of each primary virtual pavement descriptor for each value of the altitude based on each law of variation of each real pavement descriptor and each law of variation of each secondary virtual pavement descriptor.

5. The method according to claim 4, wherein the at least one real pavement descriptor and the at least one secondary virtual pavement descriptor describe analogous physical quantities of an interaction between the tyre and the real indenters and the virtual indenters.

6. The method according to claim 4, wherein:
the at least one real pavement descriptor includes:
a real deformation of the tyre by the real indenters, and
a real volume indented in the tyre by the real indenters, and
the at least one secondary virtual pavement descriptor includes:
a virtual deformation of the tyre by the virtual indenters, and
a virtual volume indented in the tyre by the virtual indenters.

7. The method according to claim 2, wherein, for each value of the altitude, the virtual indenters are represented by identical spheres.

8. The method according to claim 1, wherein a rolling noise of the tyre on the pavement is predicted based on a law for predicting the rolling noise as a function of an interaction value of at least one pavement descriptor.

9. The method according to claim 8,
wherein the at least one pavement descriptor includes a real number of real indenters per unit area of the pavement, and
wherein the interaction value is a maximum value of the number of real indenters per unit area of the pavement.

10. The method according to claim 8,
wherein the at least one pavement descriptor includes a virtual radius of spheres, and
wherein the interaction value is a value of the virtual radius of the spheres.

11. The method according to claim 1, wherein the method is performed using a computer program with code instructions executed on a computer.

12. The method according to claim 1, wherein the method is used in manufacturing pavement.

13. A non-transitory computer-readable recording medium storing code instructions that, when executed by a computer, causes the computer to perform a method for predicting at least one physical interaction effect between a tyre and a roadway pavement, the method comprising:
charting data obtained from a measurement of a surface of the pavement, to produce a real profile of the pavement;
sectioning the real profile into several strata, each stratum corresponding to an altitude of the real profile;
determining at least one law of variation of at least one pavement descriptor based on the real profile, as a function of the altitude;
determining an interaction value of each pavement descriptor, for each law of variation; and
predicting a value (B) of a physical interaction effect based on an interaction value of at least one pavement descriptor.

14. A method for predicting at least one physical interaction effect between a tyre and a roadway pavement, the method comprising:
installing, on a first computer connected to a telecommunications network, computer code that includes instructions for:
charting data obtained from a measurement of a surface of the pavement, to produce a real profile of the pavement,
sectioning the real profile into several strata, each stratum corresponding to an altitude of the real profile,
determining at least one law of variation of at least one pavement descriptor based on the real profile, as a function of the altitude,
determining an interaction value of each pavement descriptor, for each law of variation, and
predicting a value (B) of a physical interaction effect based on an interaction value of at least one pavement descriptor; and
enabling the computer code to be downloaded by a second computer connected to the telecommunications network.

* * * * *